(12) United States Patent
Messing (10) Patent No.: US 7,039,805 B1
(45) Date of Patent: May 2, 2006

(54) ELECTRONIC SIGNATURE METHOD

(76) Inventor: John H. Messing, 6571 N. Silver Smith Pl., Tucson, AZ (US) 85712

( * ) Notice: Subject to any disclaimer, the term of this patent is extended or adjusted under 35 U.S.C. 154(b) by 0 days.

(21) Appl. No.: 09/081,872

(22) Filed: May 20, 1998

(51) Int. Cl.
*H04L 9/00* (2006.01)

(52) U.S. Cl. .................. 713/170; 713/176; 713/178

(58) Field of Classification Search ............. 713/170, 713/176, 178
See application file for complete search history.

(56) References Cited

U.S. PATENT DOCUMENTS

| | | | | |
|---|---|---|---|---|
| 4,264,782 | A | * 4/1981 | Konheim | 4/222.2 |
| 4,405,829 | A | 9/1983 | Rivest et al. | 178/22.1 |
| 5,136,646 | A | * 8/1992 | Haber et al. | 380/49 |
| 5,136,647 | A | * 8/1992 | Haber et al. | 380/49 |
| 5,231,668 | A | 7/1993 | Kravitz | 380/28 |
| RE34,954 | E | * 5/1995 | Haber et al. | 713/178 |
| 5,465,299 | A | 11/1995 | Matsumoto et al. | 380/23 |
| 5,544,255 | A | 8/1996 | Smithies et al. | 382/119 |
| 5,588,061 | A | 12/1996 | Ganesan et al. | 380/30 |
| 5,613,012 | A | 3/1997 | Hoffman et al. | 382/115 |
| 5,647,017 | A | 7/1997 | Smithies et al. | 382/119 |
| 5,666,420 | A | * 9/1997 | Micali | 380/30 |
| 5,671,285 | A | * 9/1997 | Newman | 380/30 |
| 5,689,567 | A | 11/1997 | Miyauchi | 380/25 |
| 5,802,499 | A | * 9/1998 | Sampson et al. | 705/35 |
| 6,018,801 | A | 1/2000 | Palage et al. | 713/201 |
| 6,188,766 | B1 | * 2/2001 | Kocher | 380/246 |
| 6,237,096 | B1 | * 5/2001 | Bisbee et al. | 713/178 |
| 6,453,416 | B1 | * 9/2002 | Epstein | 713/170 |

OTHER PUBLICATIONS

The Microsoft Press Computer Dictionary, 3rd edition, 1997, p. 512.*
Cotter and Messing, "Electronic Filing in the Pima County Small Claims Court—Technical Parameters, Adopted Solutions, and some of the Legal Issues Involved", 38 Jurimetrics J. 397-406 (Jun. 24, 1998).
Newman and Smithies, "Questioned Electronic Document Examination", PenOp & American Academy of Forensic Sciences (Feb. 1997), pp. 1-8.
Benjamin Wright, "The Legality of the PenOp® Signature", Pen Op (1994) pp. 1-8.
Gail L. Grant, "Digital Signature Technology", *Understanding Digital Signatures* (McGraw Hill 1998), Appendix II, pp. 235-243.
Baum and Ford, Secure Electronic Commerce (1997), pp. 332-333 and accompanying endnote.

* cited by examiner

*Primary Examiner*—Andrew Caldwell
*Assistant Examiner*—Michael Pyzocha (57) ABSTRACT

An electronic signature program to create an electronic signature for documents, filings, and transactions records effectuated between computers. A computer user is authenticated by a server computer. The computer user supplies certain information to the server computer, which extracts the information, and when a signature command is received, combines certain of the user submitted information with certain predetermined elements of the system information of the server, then digitally signs this combination of information along with the document, filing or transaction record which is being signed. The digitally signed combined information is returned to the user as the user's electronic signature of the information which was submitted for signature, together with the signed information, being the document, filing, or transaction record itself.

3 Claims, 5 Drawing Sheets

ELECTRONIC SIGNATURE METHOD

CROSS REFERENCES TO RELATED APPLICATIONS

None.

BACKGROUND—FIELD OF INVENTION

This invention relates to creating and verifying between computers and on computer networks electronic signatures for electronic documents, filings and transaction records.

BACKGROUND—DESCRIPTION OF PRIOR ART

An electronic document, legal filing or record of an electronic commercial transaction requires a way to authenticate the parties. Because handwritten signatures on paper have performed the authentication function traditionally, and electronic documents do not allow for a similar method of authentication, electronic substitutes must be found.

Until now, two principally different systems have been devised for "signing" electronic documents, but each has one or more significant drawbacks.

One such system, based upon the invention shown in U.S. Pat. No. 4,405,829 to Rivest et al. (1983) uses client-side digital signatures and certificates created through the technology of "asymmetric encryption." Electronic communications are signed with the private key, in a two step process. First a digest of a message is created with a one way hash function, and then the hash function is encrypted using the private key. The authenticity of the message and its contents can be verified by a recipient as being authentic and sent from the signing party through testing of the message using the public key. Either an altered message or fraudulent sender will be detected by a computer possessing the proper software, the public key, and the digital certificate of the signer. If the message has been altered or the signer did not use the proper private key, the verification will fail. This method is useful for electronic authentication.

For additional security in authentications, certification authorities typically identify the key holders and issue certificates to verify that they belong to the party who is identified as the holder of the key pair. They maintain lists of active and revoked certificates for use by relying third parties. Determination of authentication requires not only a check of the digital signature on the message, but also of the status of the certificate identifying the signer, which involves accessing the certificate authority and knowing how to check the lists of revoked and suspended certificates. The investment to create and operate a certification authority is considerable.

Private keys are susceptible to theft from the computers or devices where they are stored, and when stolen, can be used to commit fraud with virtually no detection until the certificate of the user is revoked by the certification authority with respect to that particular corresponding public and private key pair. Private keys can also be compromised by sharing the passwords used to access them. It is often inconvenient to install the keys and certificates on individual desktop or laptop machines, or to replace them in the event of suspected compromise or upon the certificate's expiration.

The creation and maintenance of the certification authority infrastructure requires a massive investment in equipment and personnel that results in a relatively high cost to the end user where suitable means are adopted by the certification authority to verify the true identity of a holder of a private key before issuance of a digital certificate to the alleged owner of the key.

PenOp, U.S. Pat. No. 5,554,255 (1994), and continuation Ser. No. 298,991, U.S. Pat. No. 5,647,017 (1997) and related patents cited therein, adopts a completely different approach to electronic signatures. It uses digital drawing tablets on client machines as a basis for digitally capturing a handwritten signature, and then through software stores certain signature characteristics which identify the dynamic movements of the writer's hand as it moves the stylus on the tablet during signature creation, in addition to the image of the signature on the tablet. This stored information is then compared to a subsequently generated signature to determine if the signature is authentic. If a hash function is captured, digested, and linked to the document, this approach, like the "digital signature" approach of "asymmetric encryption" can determine any changes that have been made to the document since the signature was applied.

This "dynamic signature" approach avoids the massive infrastructure of the "public key encryption" certification authorities, and the problem of conflicting legal regimes applicable to electronic signing of documents in an international or multi-jurisdictional setting, but it requires the provision of a digital drawing tablet and stylus at each computer workstation where signature is to be accomplished, as well as the related software, which can be a significant system-wide item of cost. In addition, traditional forensic analysis applicable to handwritten signatures does not yet apply to electronic signature analysis, and it may be some time, if ever, before the legal forensic community becomes adept at dynamic signature handwriting analysis. Because there is no way at present for expert analysis of dynamic signatures, the ability to authenticate signatures is arguable at best.

OBJECTS AND ADVANTAGES

Accordingly, several objects and advantages of the invention are to provide a new type of electronic signature that does not depend upon the extensive certification authority infrastructure of digital signatures on multiple client machines based on asymmetric encryption or the hardware and software investment of dynamic signatures; further that it uses a signature key at a server computer rather than many signature keys of many client computers, further that it can automatically incorporate authentication information about the signer and generate and affix a date and time parameter taken from the server's clock as further evidence of identity authentication at the time of the signature and verification; further that it eliminates the need for development of a discipline that does not yet exist, namely, the forensic science of electronic handwriting analysis; and that further allows for the use by incorporation of many types of authentication into its system, as well as others that may emerge in the future.

Still further objects and advantages will become apparent from a consideration of the ensuing description and accompanying drawings.

SUMMARY

In accordance with the present invention, an electronic signature program is described for the creation, monitoring, and verification of an electronic signature generated by the interaction between two computers, one a client and the other a server, for the signing of electronic data, such as documents, filings or transaction records without the need for an expensive and massive infrastructure of certification authorities and the complexities of installing and using digital certificates, including cross-certifications, and/or without requiring hardware tablets and associated computer software. This system further is able to incorporate other existing technologies of prior art designed to authenticate users to a server computer and ones not yet available or existing.

DESCRIPTION—FIGS. 1 TO 5

Figure 1:
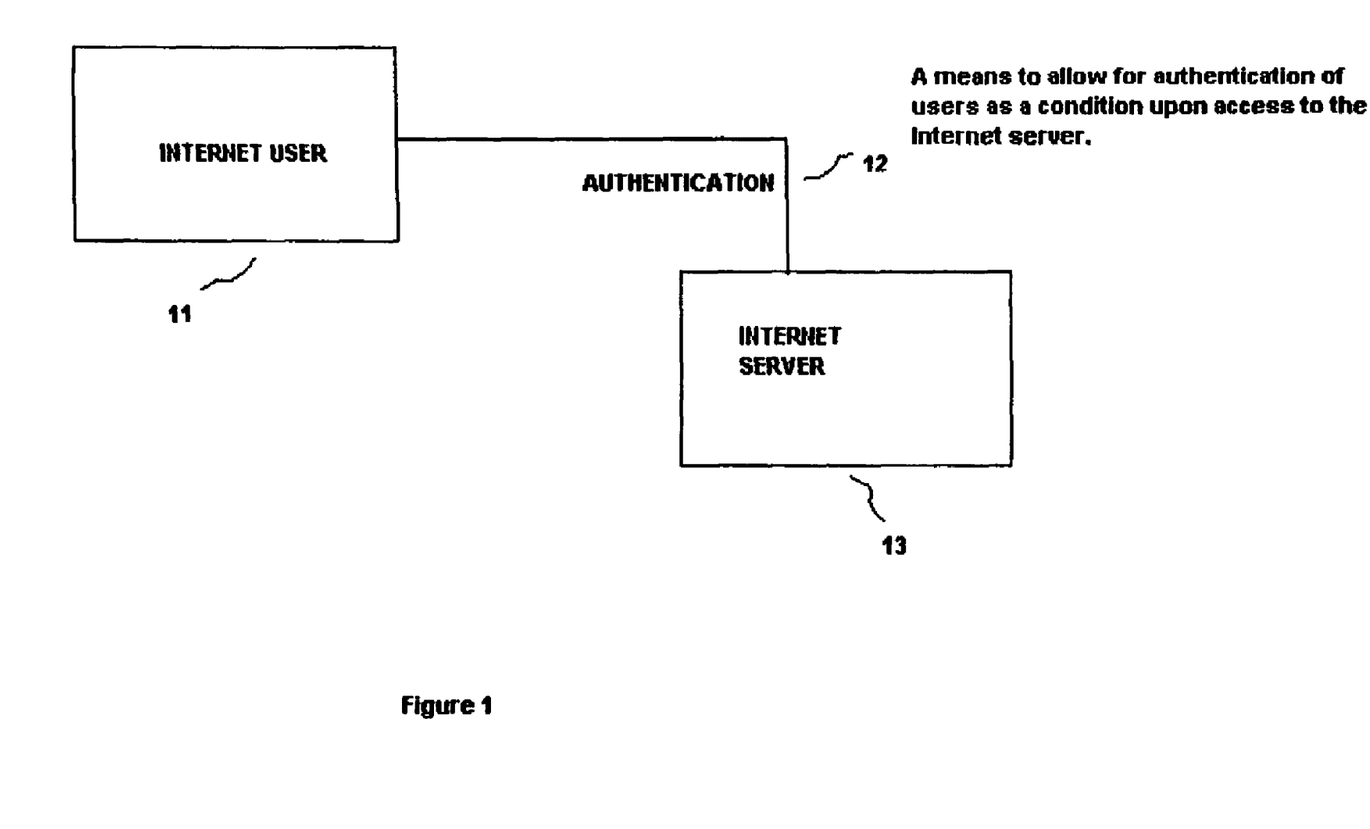
FIG. 1 shows authentication as a means of access by a web browser to a web server. Only certain transactions may require authentication confirmation.

The electronic signature is affixed between computers over the Internet. FIG. 1 depicts the initial contact between an Internet client user and an Internet server. This is accomplished by an ordinary web browser. Users are identified. A method for authenticating users allows the additional option to screen out unauthorized users (FIG. 1, no. 12). To access the signature device, users must pass the authentication gateway. Where unauthorized users are excluded, many different systems of screening out unauthorized computer users can be utilized, including but not limited to digital certificates to users from trusted third parties, previously issued passwords, stored and verifiable dynamic signatures, credit card authorizations, retinal scans and other authentication methods, without limitation. Unless the system is open to all users, unauthorized users are rejected by the system using the authentication system. If the system is open, then authentication confirmation is not required, and all users are permitted to create electronic signatures, using their asserted names as identifiers without an identity check.

Figure 2:
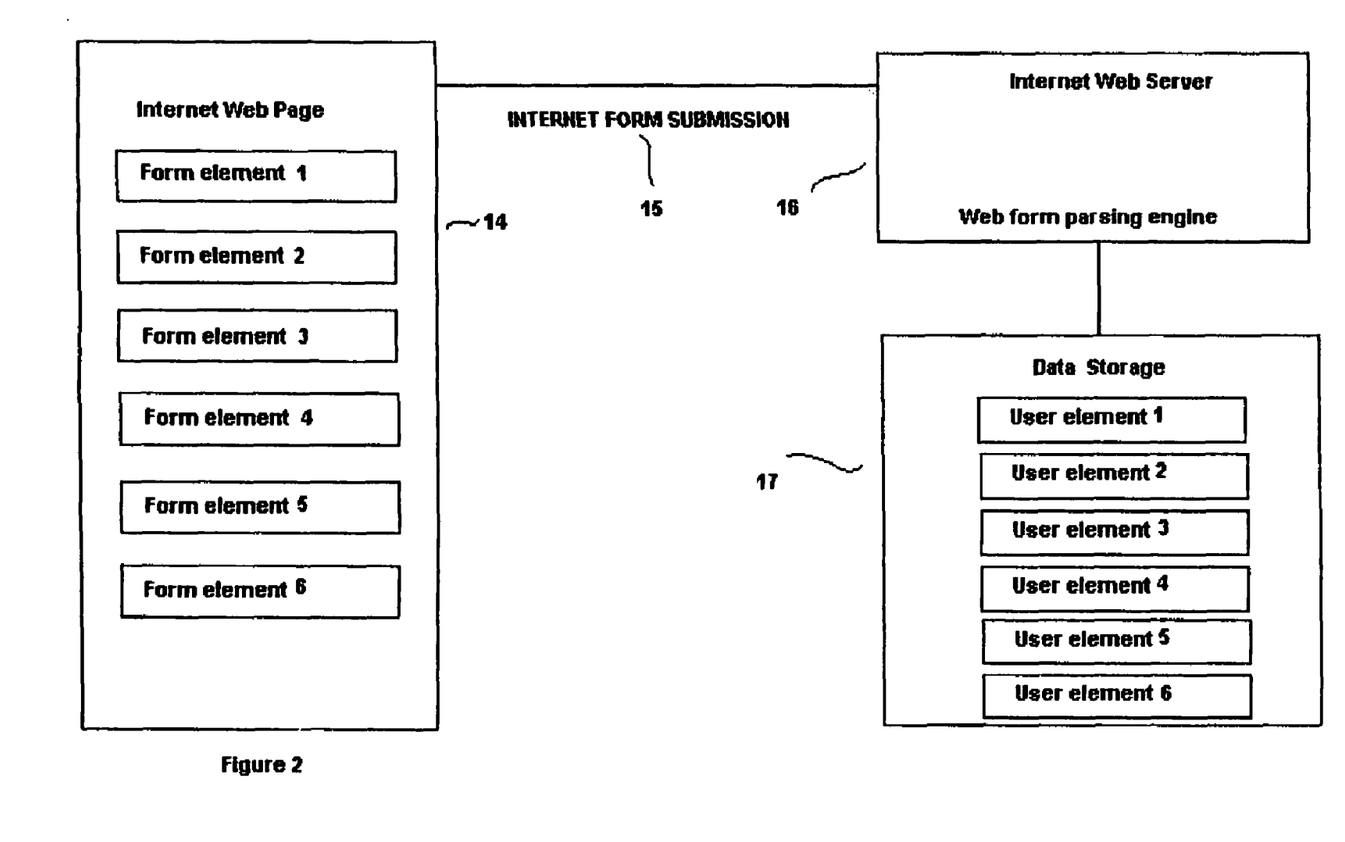
FIG. 2 shows a web server that "parses" or separates out for storage textual information or binary files transmitted by a web form page.

Information is collected from the users as shown in FIG. 2, (no. 14). It is transmitted for the purpose of (no. 15), parsing (separating out discrete information supplied by the user upon submission of a web page form that is specific to and may upload a filing, document or transaction)(no. 16) and storage of the information by the server computer (no. 17).

Figure 3:
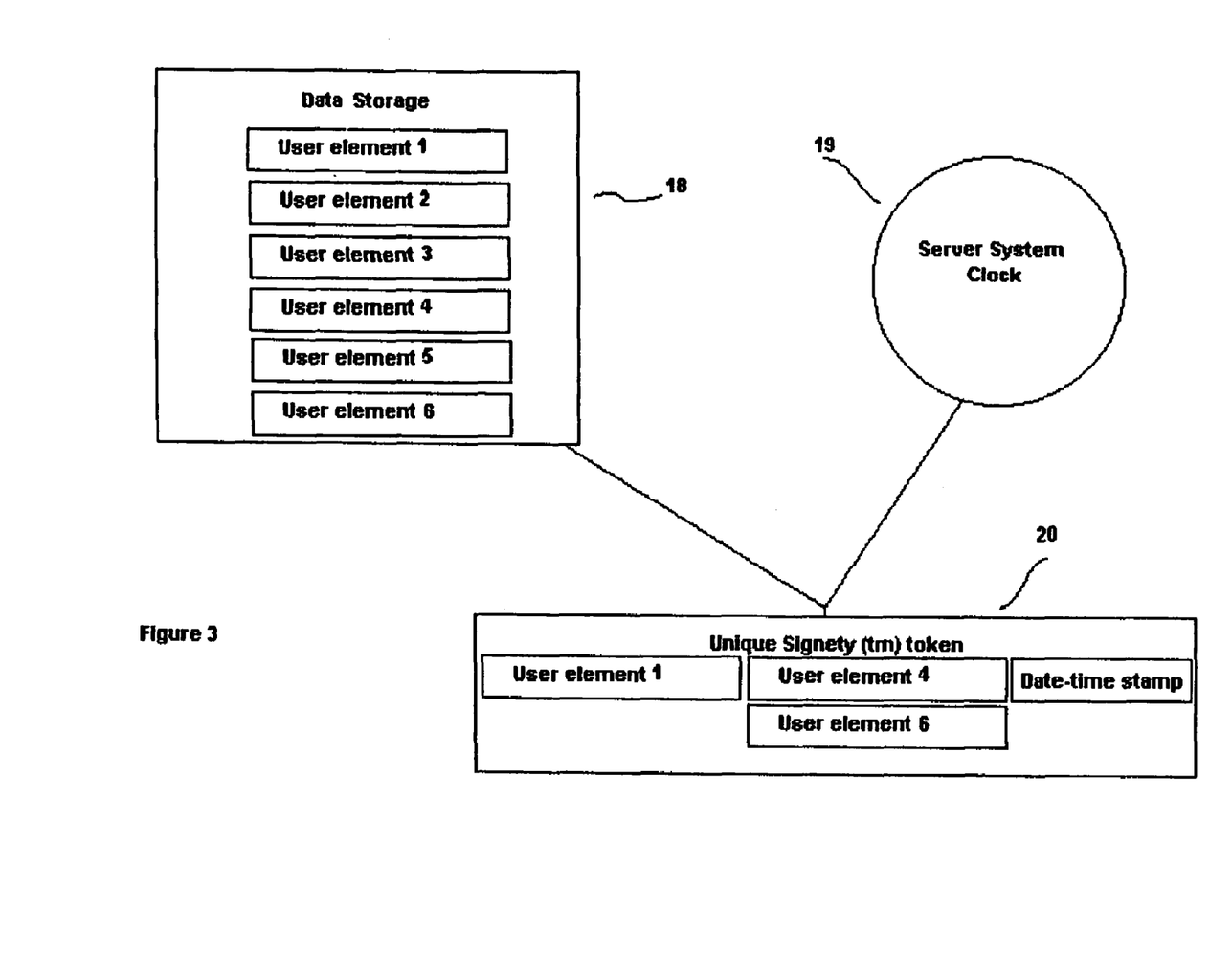
FIG. 3 shows the creation of the signature from submitted information and the system clock.

Creation of the signature is depicted in FIG. 3. In the preferred embodiment, the server has captured the unique network element parameter of a signer, and where available, a credit card authorization number from a card processor. Where authentication on the basis of stored identity criteria, such as a digital certificate, username and password, or biometrics is involved, alphanumeric elements, appropriate symbols or abbreviations can be used to represent these. Other user identifier elements are known to those skilled in the art and may include a legacy application that has developed a user identifier system. Information from the user elements (no. 18) are combined with the date-time parameters of the server's system clock (no. 19) to create a signature transaction record, optionally with a Globally Unique Identifier (GUID) derived from the blend of the components through message digesting. (no. 20). Because time continuously progresses, each signature transaction that occurs sequentially at the signature server may be uniquely identifiable through the date and time of its creation. A unique network location, expressed as an IP address adds another element of uniqueness where two signature transaction records are created so closely in time as to have identical dates and time of creation. Since it is almost impossible for them to have originated simultaneously from the same network location, a unique network element parameter enables distinguishing between them. Adding identification of the user to the signature transaction, as through a username or a credit card authentication, binds the unique signature transaction record to the user's identity. This combination also permits the server's date and time of record creation to be incorporated under the signature. A hash of the concatenated field values of the unique signature transaction record can serve as a GUID, because each hash of a unique set of values is itself unique. Such a GUID simply can be added as another field of its corresponding signature transaction record as a convenient shorthand unique identifier that can be used to locate, refer to, or identify it.

Figure 4:
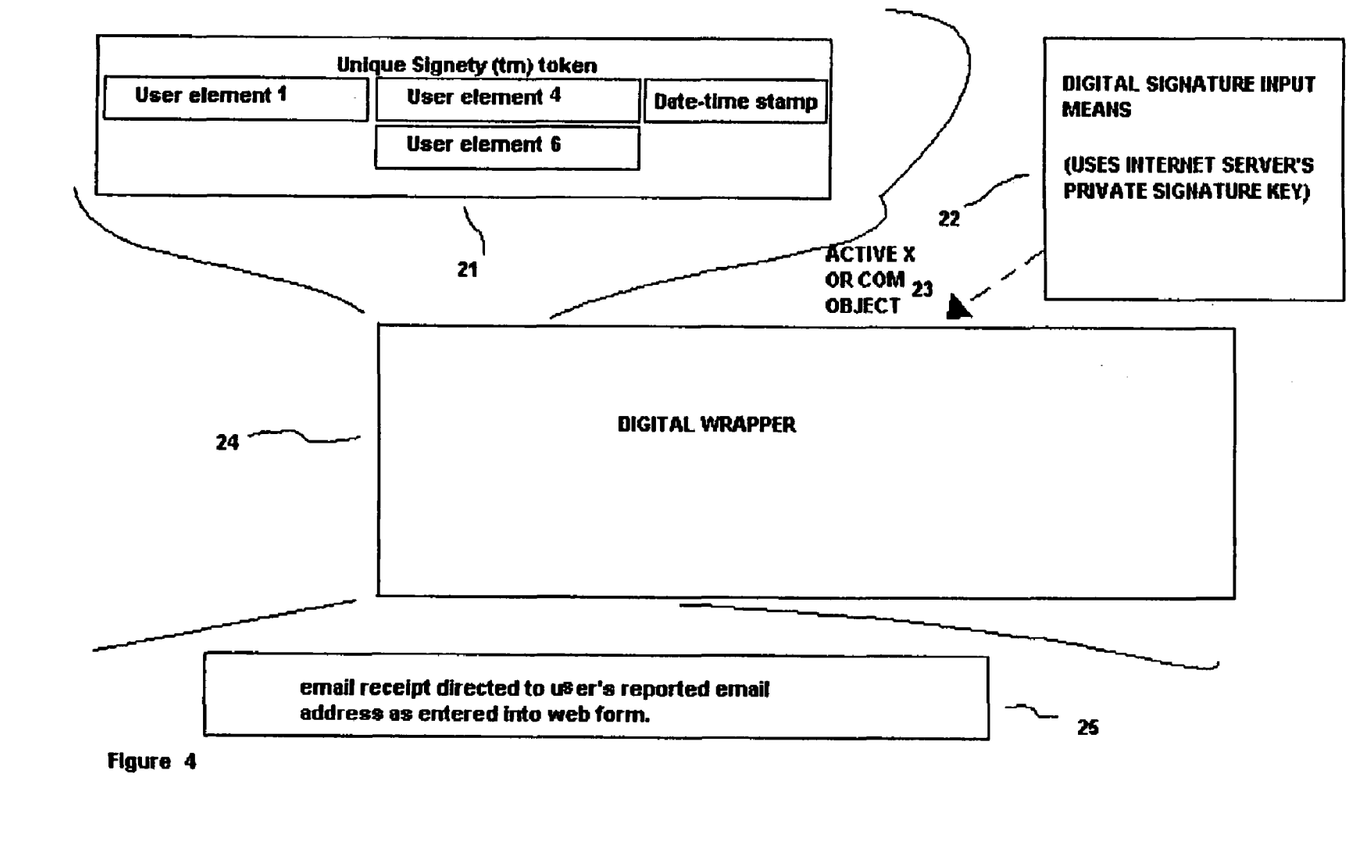
FIG. 4 is a representation of the machine process whereby the computer signs with the server's private key and wraps it in a digital wrapper.

FIG. 4 demonstrates the digital signature of the server computer digitally wraps the data. An active X (com) object or other applications programming interface (API)(no. 23) at the Internet server communicates with the signature program of the Internet server to hash and sign the information (no. 22) to be contained under the signature (no. 21), including the unique signature transaction record fields, which may be represented by the GUID, with a private key located at the server. Once the signature is thus generated, it also constitutes signature transaction meta-data that is stored at the server and can be included in an automatically generated email message (no. 25) which is sent to the user at the email address that the user self-reported to the Internet server initially.

To verify a signed document, it is resubmitted to the server, where the symmetrically encrypted version of the digital signature is decrypted by recreating the symmetric key from the signature transaction record components, and applying it, and then normal verification on the basis of the server's public key is invoked.

The encrypted digital signature ensures that the information included as the basis for the symmetric key, including signature transaction record particulars, date and time values, and electronic signature cannot be altered after the fact without such change being detectable through software upon verification.

The preferred embodiment also enables signer-supplied form submission data to be inserted into appropriate locations in a transaction template to be signed as part of a completed document, which may include standard terms applicable to the class of transactions. This enables standardized contracts and clauses to be included in legally binding contracts. The template may simply be a blank (structure only) document, to be filled in completely by the user, or it also may include "boilerplate", meaning standardized language that is intended to remain in the document. Boilerplate is commonly associated with legal, financial, real estate and mortgage phrases and provisions that are intended as inalterable in the document finalization and signature process. For example, it can include standard terms for purchase orders. For example, it can include notices and averments to governmental regulatory bodies. For example, it can include electronic credit card charge slips. By putting the boilerplate terms and conditions at the server and incorporating them as a template that cannot be modified by a signer, unauthorized pre-signature modifications are prevented. For example, in an extreme example, the template located on the server consists completely or almost entirely of boilerplate language that the signer is expected to accept and sign or reject without adding, modifying or inserting any information specific to the signer or transaction. For example, the transaction template may be used to generate an envelope for the transmission and routing of one or more documents or files that are embedded into the envelope. Any of the documents and files with a potential to be embedded in or attached to an envelope can also be signed using this invention.

As one skilled in the art can appreciate, signature transaction data or a pointer to it may appear in the document, in a database record, in a cookie on a client user's machine or as part of the signed file information. The template can also include formatting and structuring information so that the relying party receives a document that can be read using commercially available proprietary programs and methods. For example, the relying party may want to have the transaction in a word processing format. For example, the relying party may want to have the document include mark up tags common to and from such programs and languages as Hypertext Mark Up Language (HTML), Rich Text Format (RTF), Standard General Markup Language (SGML) or Extensible Markup Language (XML), and commonly used word processing formats. For example, the relying party may want to have a particular stylesheet associated with a document to preserve its layout as well as text and require the signer to sign this presentation formatting as well. By putting the templates and encryption keys on the server, and exposing the methods and properties of signature applications at the server, inconveniences caused by the complexities of using keys and certificates, and incompatibilities between operating systems and environments of the various signers' and relying parties' computers are also avoided.

Return of signature transaction information to the individual who signed the information in an email message serves as a receipt and proof from the server of a valid signature transaction. Such a proof of transaction can be asymmetrically signed by the server, providing inalterable proof successful signature verification as of a particular time.

Figure 5:
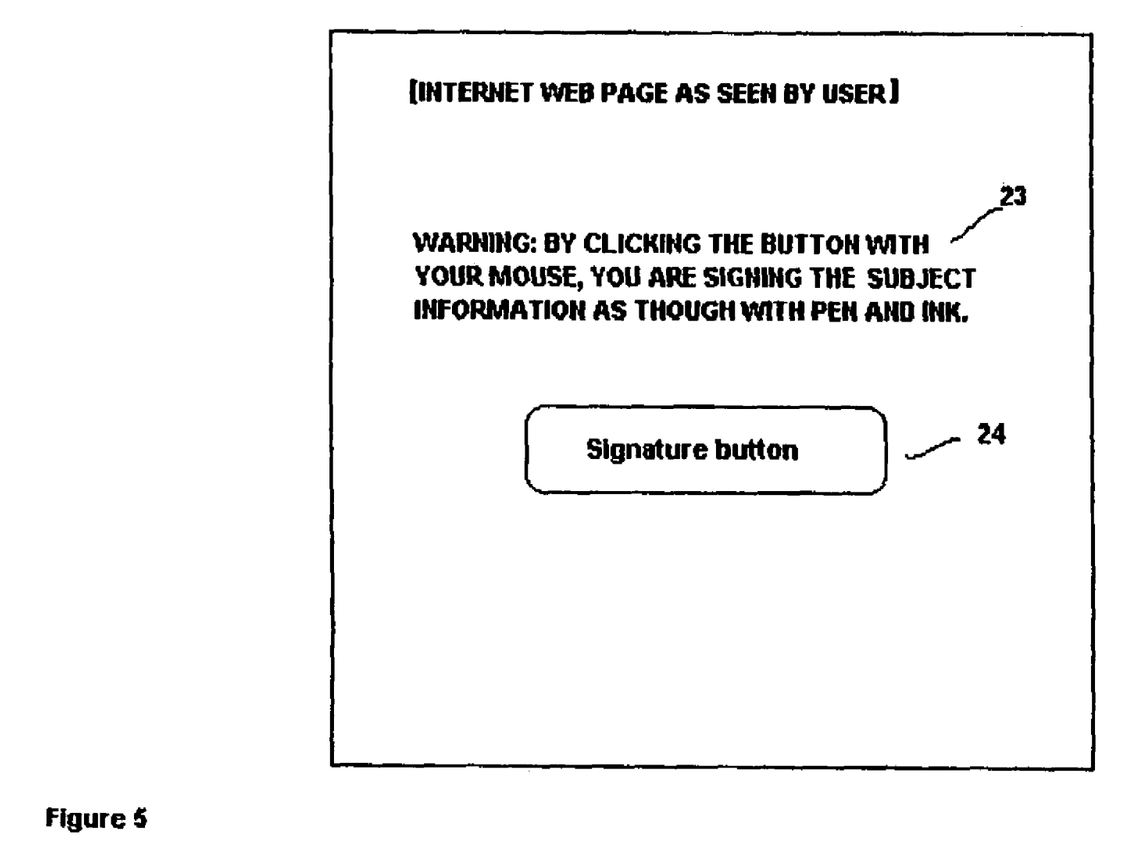
FIG. 5 is a representation of a web page as shown to the user which contains the signature button and statement of intent for signing the document.

FIG. 5 depicts the mechanism for actually invoking the signature device, as viewed by the user. A simple button (no. 26) is clicked by the user, coupled with a clear warning (no. 27) of the consequences of clicking the signature button. Once the button is clicked, the electronic signature feature is enabled. This feature assures relying parties of the intent of the signer. Other means of user interaction with a machine besides the clicking of a button will be evident to one skilled in the art, and may include by way of examples a voice activated command, the pressing of a button on a keyboard, the use of a stylus or a finger on a screen, manipulation of an image or icon, or a button on the remote control device for a television.

If the email receipt containing the proof of signature is received by the signer, that individual optionally may be required to countersign the receipt digitally (preferably using asymmetric encryption) and then to return the resigned message back to the server computer for storage and as further proof of receipt and authentication. This receipt at the server computer proves that the user actually received the electronically signed message, and the digital signature can be stored at the server as a further guarantee of message authenticity. As one skilled in the art will realize, the example of email transmission is one of many possible ways of transmitting the signed proof of signature from the server to its destination. Other examples include the saving of a web page of information directly from a browser to a hard drive, or the downloading of a document from one machine to another, or transmission via HTTP and XML.

CONCLUSIONS, RAMIFICATIONS, AND SCOPE

Accordingly, it can be seen that the above system allows client computer users to sign electronic documents, filings and transaction records submitted to a server computer as though with pen and ink on paper, without any additional hardware or software apart from an Internet web browser. The signature program reduces the need for a massive infrastructure investment of certification authorities by relying solely upon the digital certificate of the server computer, without any similar requirement that the signing party obtain a separate digital certificate, unless optionally required for receipt signing purposes. The method is able to make use of other current and future technologies for computer user authentication systems, and is suited for the Internet and other computer networks. The use of a second encryption layer has a further advantage of protecting the private key. Without the symmetric digital wrapper that changed with each signer transaction, an attacker might be able to deduce the private key attributes from an examination of a myriad of signatures and hash values. The symmetrically encrypted signature value also can serve to protect the underlying asymmetric signature at a future time when a factoring attack on asymmetric signatures by significantly more powerful computers may become computationally feasible. The symmetric encryption of the returned asymmetric signature value serves to shield the asymmetric private key from a factoring attack as the symmetric enciphering wrapper cloaks the asymmetric signature value, hiding it from the attacker.

Although the description above contains much specificity, this should not be construed as limiting the scope of the invention but as merely providing illustrations of some of the presently preferred embodiments of this invention. Various other embodiments and ramifications are possible within its scope. Modification within the spirit of the invention will also be apparent to those skilled in the art. For example, other unique system information of the server can be used in addition to the system clock to generate a signature transaction record, all or parts of which may also be encrypted. For example, copies of a single asymmetric key may be distributed among several different servers, or a single server may have a number of different asymmetric keys for use by each of various assigned individuals, entities or groups. For example, signers may be authenticated by trusted third party assertions. For example, a message digest generated during signature may be encrypted only using a symmetric key, rather than an asymmetric key, bypassing a second encryption step. Alternatively, the symmetric encryption of the message digest may precede the asymmetric encryption, allowing the asymmetric encryption to act as a digital wrapper for the symmetric encryption. For example, electronic processes may sign as client users on behalf of individuals or entities. For example, enveloped or enveloping digital signatures may be generated using this invention in addition to detached digital signatures. Thus the scope of the invention should be determined by the appended claims and their legal equivalents, rather than by the examples given.

I claim:

1. A method for signing and verifying electronic data by or on behalf of another at a server comprising:
   a. an authentication step of creating a collection of records about a plurality of individuals by entering into a data storage medium a collection of at least one of the following:
      i. personal information about an individual,
      ii. an indicator of the reliability of the identification of the individual who is the subject of a record,
      iii. whether the authentication mode is universal or whether such individual must authenticate to the server computer in order to sign electronic data using the server, and
      iv. an authentication credential or plurality of authentication credentials that the individual must present to the server in order to sign;
   b. an access control step of
      i. receiving a request from a requester to sign and, unless the authentication mode is universal, an authentication credential or a plurality of authentication credentials from the requester, and
      ii. comparing the authentication credential or credentials to the information contained in the collection of records to determine if the requestor is authorized to sign electronic data using the server;
   c. a presentation step of providing to the server an electronic data set for signature;
   d. a transaction identifier step of generating at the server a globally unique transaction identifier for the electronic data set that the requester intends to sign, which includes as one input an identifier associated with an identity of the requestor;
   e. a signature step whereby the server encrypts, as the signature of a signer, each electronic data set with a unique encryption key generated from a symmetric cipher using the globally unique transaction identifier as character input for a password for generation of the key;
   f. a recording step in which the server generates and stores in a data storage medium a record of a signature transaction;
   g. a verification step whereby
      i. an inquiring party seeking to validate a signature of electronic data transmits to a server electronic data that is believed to have been previously signed at a server;
      ii. the server that receives the electronic data that is believed to have been previously signed at a server determines if a record or a plurality of records corresponding to the transmitted electronic data exists in the data storage medium of such records;
      iii. the server retrieves a record or plurality of records corresponding to the electronic data which is presented for verification;
      iv. with regard to each such record, the server performs a verification operation which includes a step of reconstructing a symmetric cipher from a record of input for a password of a key that was used to create an encryption key initially, including an identifier of the signer, and applying such symmetric cipher to decrypt the electronic data set;
      v. after decryption, the server reports to an inquiring party,
         1. whether the electronic data submitted for verification remains unmodified since a signature was affixed, and
         2. an identity of a signer of the electronic data.

2. The method of claim 1 wherein the electronic data set which is symmetrically encrypted during signature and decrypted upon verification at a server consists of one of the following:
   a. a message digest of the electronic data;
   b. a crypto-transformation, created using a private key, of the message digest of the electronic data.

3. The method of claim 1 wherein the electronic data submitted for signature consists of one of the following:
   a. form input of a signer;
   b. a combination of form input of a signer and standardized words, clauses, or phrases.

* * * * *

UNITED STATES PATENT AND TRADEMARK OFFICE
CERTIFICATE OF CORRECTION

| | | |
|---|---|---|
| PATENT NO. | : 7,039,805 B1 | Page 1 of 6 |
| APPLICATION NO. | : 09/081872 | |
| DATED | : May 2, 2006 | |
| INVENTOR(S) | : Messing | |

It is certified that error appears in the above-identified patent and that said Letters Patent is hereby corrected as shown below:

Delete Title page and insert new Title page as attached.

Delete columns 1-8 and insert columns 1-8 as attached.

Signed and Sealed this

Twenty-seventh Day of February, 2007

JON W. DUDAS
*Director of the United States Patent and Trademark Office*

United States Patent
Messing (10) Patent No.: US 7,039,805 B1
(45) Date of Patent: May 2, 2006

(54) ELECTRONIC SIGNATURE METHOD

(76) Inventor: John H. Messing, 6571 N. Silver Smith Pl., Tucson, AZ (US) 85712

(*) Notice: Subject to any disclaimer, the term of this patent is extended or adjusted under 35 U.S.C. 154(b) by 0 days.

(21) Appl. No.: 09/081,872

(22) Filed: May 20, 1998

(51) Int. Cl.
*H04L 9/00* (2006.01)
(52) U.S. Cl. .................. 713/170; 713/176; 713/178
(58) Field of Classification Search ............... 713/170, 713/176, 178
See application file for complete search history.

(56) References Cited

U.S. PATENT DOCUMENTS

| | | | |
|---|---|---|---|
| 4,264,782 A * | 4/1981 | Konheim | 4/222.2 |
| 4,405,829 A | 9/1983 | Rivest et al. | 178/22.1 |
| 5,136,646 A * | 8/1992 | Haber et al. | 380/49 |
| 5,136,647 A * | 8/1992 | Haber et al. | 380/49 |
| 5,231,668 A | 7/1993 | Kravitz | 380/28 |
| RE34,954 E * | 5/1995 | Haber et al. | 713/178 |
| 5,465,299 A | 11/1995 | Matsumoto et al. | 380/23 |
| 5,544,255 A | 8/1996 | Smithies et al. | 382/119 |
| 5,588,061 A | 12/1996 | Ganesan et al. | 380/30 |
| 5,613,012 A | 3/1997 | Hoffman et al. | 382/115 |
| 5,647,017 A | 7/1997 | Smithies et al. | 382/119 |
| 5,666,420 A * | 9/1997 | Micali | 380/30 |
| 5,671,285 A * | 9/1997 | Newman | 380/30 |
| 5,689,567 A | 11/1997 | Miyauchi | 380/25 |
| 5,802,499 A * | 9/1998 | Sampson et al. | 705/35 |
| 6,018,801 A * | 1/2000 | Palage et al. | 713/201 |
| 6,188,766 B1 | 2/2001 | Kocher | 380/246 |
| 6,237,096 B1 * | 5/2001 | Bisbee et al. | 713/178 |
| 6,453,416 B1 * | 9/2002 | Epstein | 713/170 |

OTHER PUBLICATIONS

The Microsoft Press Computer Dictionary, 3rd edition, 1997, p. 512.*
Cotter and Messing, "Electronic Filing in the Pima County Small Claims Court—Technical Parameters, Adopted Solutions, and some of the Legal Issues Involved", 38 Jurimetrics J. 397-406 (Jun. 24, 1998).
Newman and Smithies, "Questioned Electronic Document Examination", PenOp & American Academy of Forensic Sciences (Feb. 1997), pp. 1-8.
Benjamin Wright, "The Legality of the PenOp® Signature", Pen Op (1994) pp. 1-8.
Gail L. Grant, "Digital Signature Technology", *Understanding Digital Signatures* (McGraw Hill 1998), Appendix II, pp. 235-243.
Baum and Ford, Secure Electronic Commerce (1997), pp. 332-333 and accompanying endnote.

* cited by examiner

*Primary Examiner*—Andrew Caldwell
*Assistant Examiner*—Michael Pyzocha (57) ABSTRACT

An electronic signature program to create an electronic signature for documents, filings, and transactions records effectuated between computers. A computer user is authenticated by a server computer. The computer user supplies certain information to the server computer, which extracts the information, and when a signature command is received, combines certain of the user submitted information with certain predetermined elements of the system information of the server, then digitally signs this combination of information along with the document, filing or transaction record which is being signed. The digitally signed combined information is returned to the user as the user's electronic signature of the information which was submitted for signature, taken together with the signed information, being the document, filing, or transaction record itself.

3 Claims, 5 Drawing Sheets

ELECTRONIC SIGNATURE METHOD

CROSS REFERENCES TO RELATED APPLICATIONS

None.

BACKGROUND—FIELD OF INVENTION

This invention relates to creating and verifying between computers and on computer networks electronic signatures for electronic data, including electronic documents, filings and transaction records.

BACKGROUND—DESCRIPTION OF PRIOR ART

An electronic document, legal filing or record of an electronic commercial transaction requires a way to authenticate the parties. Because handwritten signatures on paper have performed the authentication function traditionally, and electronic documents do not allow for a similar method of authentication, electronic substitutes must be found.

Until now, two principally different systems have been devised for "signing" electronic documents, but each has one or more significant drawbacks.

One such system, based upon the invention shown in U.S. Pat. No. 4,405,829 to Rivest et al. (1983) uses client-side digital signatures and certificates created through the technology of "asymmetric encryption." Electronic communications are signed with the private key, in a two step process. First a digest of a message is created with a one way hash function, and then the hash function is encrypted using the private key. The authenticity of the message and its contents can be verified by a recipient as being authentic and sent from the signing party through testing of the message using the public key. Either an altered message or fraudulent sender will be detected by a computer possessing the proper software, the public key, and the digital certificate of the signer. If the message has been altered or the signer did not use the proper private key, the verification will fail. This method is useful for electronic authentication.

For additional security in authentications, certification authorities typically identify the key holders and issue certificates to verify that they belong to the party who is identified as the holder of the key pair. They maintain lists of active and revoked certificates for use by relying third parties. Determination of authentication requires not only a check of the digital signature on the message, but also of the status of the certificate identifying the signer, which involves accessing the certificate authority and knowing how to check the lists of revoked and suspended certificates. The investment to create and operate a certification authority is considerable.

Private keys are susceptible to theft from the computers or devices where they are stored, and when stolen, can be used to commit fraud with virtually no detection until the certificate of the user is revoked by the certification authority with respect to that particular corresponding public and private key pair. Private keys can also be compromised by sharing the passwords used to access them.

The creation and maintenance of the certification authority infrastructure requires a massive investment in equipment and personnel that results in a relatively high cost to the end user where suitable means are adopted by the certification authority to verify the true identity of a holder of a private key before issuance of a digital certificate to the alleged owner of the key.

PenOp, U.S. Pat. No. 5,554,255 (1994), and continuation Ser. No. 298,991, U.S. Pat. No. 5,647,017 (1997) and related patents cited therein, adopts a completely different approach to electronic signatures. It uses digital drawing tablets on client machines as a basis for digitally capturing a handwritten signature, and then through software stores certain signature characteristics which identify the dynamic movements of the writer's hand as it moves the stylus on the tablet during signature creation, in addition to the image of the signature on the tablet. This stored information is then compared to a subsequently generated signature to determine if the signature is authentic. If a hash function is captured, digested, and linked to the document, this approach, like the "digital signature" approach of "asymmetric encryption" can determine any changes that have been made to the document since the signature was applied.

This "dynamic signature" approach avoids the massive infrastructure of the "public key encryption" certification authorities, and the problem of conflicting legal regimes applicable to electronic signing of documents in an international or multi-jurisdictional setting, but it requires the provision of a digital drawing tablet and stylus at each computer workstation where signature is to be accomplished, as well as the related software, which can be a significant system-wide item of cost. In addition, traditional forensic analysis applicable to handwritten signatures does not yet apply to electronic signature analysis, and it may be some time, if ever, before the legal forensic community becomes adept at dynamic signature handwriting analysis. Because there is no way at present for expert analysis of dynamic signatures, the ability to authenticate signatures is arguable at best.

OBJECTS AND ADVANTAGES

Accordingly, several objects and advantages of the invention are to provide a new type of electronic signature that does not depend upon the extensive certification authority infrastructure of digital signatures on multiple client machines based on asymmetric encryption or the hardware and software investment of dynamic signatures; further that it uses a signature key at a server computer rather than many signature keys of many client computers, further that it can automatically incorporate authentication information about the signer and generate and affix a date and time parameter taken from the server's clock as further evidence of identity authentication at the time of the signature and verification; further that it eliminates the need for development of a discipline that does not yet exist, namely, the forensic science of electronic handwriting analysis; and that further allows for the use by incorporation of many types of authentication into its system, as well as others that may emerge in the future.

Still further objects and advantages will become apparent from a consideration of the ensuing description and accompanying drawings.

SUMMARY

In accordance with the present invention, an electronic signature program is described for the creation, monitoring, and verification of an electronic signature generated by the interaction between two computers, one a client and the other a server, for the signing of electronic data, such as documents, filings or transaction records without the need for an expensive and massive infrastructure of certification authorities and the complexities of installing and using digital certificates, including cross-certifications, and/or without requiring hardware tablets and associated computer software. This system further is able to incorporate other existing technologies of prior art designed to authenticate users to a server computer and ones not yet available or existing.

DRAWING FIGURES

FIG. 1 shows authentication as a means of access by a web browser to a web server. Only certain transactions may require authentication confirmation.

FIG. 2 shows a web server that "parses" or separates out for storage textual information or binary files transmitted by a web form page.

FIG. 3 shows the creation of the signature from submitted information and the system clock.

FIG. 4 is a representation of the machine process whereby the computer signs with the server's private key and wraps it in a digital wrapper, and FIG. 5 is a representation of a web page as shown to the user which contains the signature button and statement of intent for signing the document.

DESCRIPTION—FIGS. 1 TO 5

The electronic signature is affixed between computers over the Internet. FIG. 1 depicts the initial contact between an Internet client user and an Internet server. This is accomplished by an ordinary web browser. Users are identified. A method for authenticating users allows the additional option to screen out unauthorized users (FIG. 1, no. 12). To access the signature device, users must pass the authentication gateway. Where unauthorized users are excluded, many different systems of screening out unauthorized computer users can be utilized, including but not limited to digital certificates to users from trusted third parties, previously issued passwords, stored and verifiable dynamic signatures, credit card authorizations, retinal scans and other authentication methods, without limitation. Unless the system is open to all users, unauthorized users are rejected by the system using the authentication system. If the system is open, then authentication confirmation is not required, and all users are permitted to create electronic signatures, using their asserted names as identifiers without an identity check.

Information is collected from the users as shown in FIG. 2, (no. 14). It is transmitted for the purpose of (no. 15), parsing (separating out discrete information supplied by the user upon submission of a web page form that is specific to and may upload a filing, document or transaction)(no. 16) and storage of the information by the server computer (no. 17).

Creation of the signature is depicted in FIG. 3. In the preferred embodiment, the server has captured the unique network element parameter of a signer, and where available, a credit card authorization number from a card processor. Where authentication on the basis of stored identity criteria, such as a digital certificate, username and password, or biometrics is involved, alphanumeric elements, appropriate symbols or abbreviations can be used to represent these. Other user identifier elements are known to those skilled in the art and may include a legacy application that has developed a user identifier system. Information from the user elements (no. 18) are combined with the date-time parameters of the server's system clock (no. 19) to create a signature transaction record, optionally with a Globally Unique Identifier (GUID) derived from the blend of the components through message digesting. (no. 20). Because time continuously progresses, each signature transaction that occurs sequentially at the signature server may be uniquely identifiable through the date and time of its creation. A unique network location, expressed as an IP address adds another element of uniqueness where two signature transaction records are created so closely in time as to have identical dates and time of creation. Since it is almost impossible for them to have originated simultaneously from the same network location, a unique network element parameter enables distinguishing between them. Adding identification of the user to the signature transaction, as through a username or a credit card authentication, binds the unique signature transaction record to the user's identity. This combination also permits the server's date and time of record creation to be incorporated under the signature. A hash of the concatenated field values of the unique signature transaction record can serve as a GUID, because each hash of a unique set of values is itself unique. Such a GUID simply can be added as another field of its corresponding signature transaction record as a convenient shorthand unique identifier that can be used to locate, refer to, or identify it.

FIG. 4 demonstrates how the digital signature of the server computer digitally wraps the data. An active X (com) object or other applications programming interface (API) (no. 23) at the Internet server communicates with the signature program of the Internet server to hash and sign the information (no. 22) to be contained under the signature (no. 21), including the unique signature transaction record fields, which may be represented by the GUID, with a private key located at the server. Once the signature is thus generated, it also constitutes signature transaction meta-data that is stored at the server and can be included in an automatically generated email message (no. 25) which is sent to the user at the email address that the user self-reported to the Internet server initially.

The digitally signed wrapper also permits signer-supplied submission information to be inserted into a document to be included under the server signature which is stored at the server as part of a transaction template, and which may include standard terms applicable to the class of transactions. The template may simply be a blank (structure only) document, to be filled in completely by the user, or it also may include "boilerplate", meaning standardized language that is intended to remain in the document. Boilerplate is commonly associated with legal, financial, real estate and mortgage phrases and provisions that are intended as inalterable in the document finalization and signature process. For example, it can include standard terms for purchase orders. For example, it can include notices and averments to governmental regulatory bodies. For example, it can include electronic credit card charge slips. By putting the boilerplate terms and conditions at the server and incorporating them as a template for signer data to complete and to be included under the signature, that cannot be modified by a signer, unauthorized pre-signature modifications are prevented. For example, in an extreme example, the template located on the server consists completely or almost entirely of boilerplate language that the signer is expected to accept and sign or reject without adding, modifying or inserting any information specific to the signer or transaction. For example, the transaction template may be used to generate an envelope for the transmission and routing of one or more documents or files that are embedded into the envelope. Any of the documents and files with a potential to be embedded in or attached to an envelope can also be signed using this invention. In each case, the template is signed by the server as part of the data that is included under the signature affixed on behalf of the signer along with the previously described unique signature transaction information, which may be represented in shorthand fashion by its corresponding GUID.

As one skilled in the art can appreciate, signature transaction data or a pointer to it may appear in the document, in a database record, in a cookie on a client user's machine or as part of the signed file information. The template can also include formatting and structuring information so that the relying party receives a document that can be read using commercially available proprietary programs and methods. For example, the relying party may want to have the transaction in a word processing format. For example, the relying party may want to have the document include mark up tags common to and from such programs and languages as Hypertext Mark Up Language (HTML), Rich Text Format (RTF), Standard General Markup Language (SGML) or Extensible Markup Language (XML), and commonly used word processing formats. For example, the relying party may want to have a particular stylesheet associated with a document to preserve its layout as well as text and require the signer to sign this presentation formatting as well. By putting the templates and encryption keys on the server, and exposing the methods and properties of signature applications at the server, inconveniences caused by the complexities of using keys and certificates, and incompatibilities between operating systems and environments of the various signers' and relying parties' computers are also avoided.

Return of this information to the individual who signed the information is a receipt that is proof of the transaction, the electronic signature, and the transaction content.

If the email address is non-existent, intermediate mail server computers usually alert the server via a failed email message that the message was undeliverable. Such a message also serves to warn the server computer that a fraudulent transaction may be in progress.

FIG. 5 depicts the mechanism for actually invoking the signature device, as viewed by the user. A simple button (no. 26) is clicked by the user, coupled with a clear warning (no. 27) of the consequences of clicking the signature button. Once the button is clicked, the electronic signature feature is enabled. This feature assures relying parties of the intent of the signer. Other means of user interaction with a machine besides the clicking of a button will be evident to one skilled in the art, and may include by way of examples a voice activated command, the pressing of a button on a keyboard, the use of a stylus or a finger on a screen, manipulation of an image or icon, or a button on the remote control device for a television.

If the email receipt containing the proof of signature is received by the signer, that individual optionally may be required to countersign the receipt digitally (preferably using asymmetric encryption) and then to return the resigned message back to the server computer for storage and as further proof of receipt and authentication. This receipt at the server computer proves that the user actually received the electronically signed message, and the digital signature can be stored at the server as a further guarantee of message authenticity. As one skilled in the art will realize, the example of email transmission is one of many possible ways of transmitting the signed proof of signature from the server to its destination. Other examples include the saving of a web page of information directly from a browser to a hard drive, or the downloading of a document from one machine to another, or transmission via HTTP and XML.

CONCLUSIONS, RAMIFICATIONS, AND SCOPE

Accordingly, it can be seen that the above system allows client computer users to sign electronic documents, filings and transaction records submitted to a server computer as though with pen and ink on paper, without any additional hardware or software apart from an Internet web browser. The signature program reduces the need for a massive infrastructure investment of certification authorities by relying solely upon a digital certificate at the server computer, without any similar requirement that the signing party obtain a separate digital certificate, unless optionally required for receipt signing purposes. The method is able to make use of other current and future technologies for computer user authentication systems, and is suited for the Internet and other computer networks.

Although the description above contains much specificity, this should not be construed as limiting the scope of the invention but as merely providing illustrations of some of the presently preferred embodiments of this invention. Various other embodiments and ramifications are possible within its scope. For example, other unique system information of the server can be used in addition to the system clock to generate a unique record and its GUID, which may also be encrypted. Modification within the spirit of the invention will also be apparent to those skilled in the art. For example, electronic processes may sign as client users on behalf of individuals or entities. For example, in another embodiment, the GUID may be used as the password or seed for a symmetric encryption cipher known to one skilled in the art such as RC4 to generate a unique encryption key. Application of this key to the document to be signed symmetrically encrypts the document. This encrypted version of the document is unique and constitutes the signature of the document. To verify the document, either the encrypted version is decrypted using the unique key, or the presented version for verification is re-encrypted using the unique key. If the presented document is genuine, the two end products will be identical. As the GUID contains also information about the identity of the signer, an electronic signature is created. As an intermediate step in the signature process, the document may optionally be hashed or digested prior to encryption with the symmetric cipher. This symmetric encryption cipher embodiment differs from the preferred embodiment, in that in the latter, a message digesting function or asymmetric key pair is used for the signature and verification functions, while in the former, in a second stage, symmetric encryption can be used to encrypt the intermediate digest or private key signature arrived at using the preferred embodiment. The encrypted digital signature ensures that the information included as the basis for the symmetric key, including signature transaction record particulars, date and time values, and electronic signature cannot be altered after the fact without such change being detectable through software upon verification. Thus the scope of the invention should be determined by the appended claims and their legal equivalents, rather than by the examples given.

I claim:

1. A method for signing and verifying electronic data by or on behalf of another at a server comprising:
   a. an authentication step of creating a collection of records about a plurality of individuals by entering into a data storage medium a collection of at least one of the following:
   i. personal information about an individual, ii. an indicator of the reliability of the identification of the individual who is the subject of a record,
iii. whether the authentication mode is universal or whether such individual must authenticate to the server computer in order to sign electronic data using the server, and
iv. an authentication credential or plurality of authentication credentials that the individual must present to the server in order to sign;
b. an access control step of
   i. receiving a request from a requester to sign and, unless the authentication mode is universal, an authentication credential or a plurality of authentication credentials from the requester, and
   ii. comparing the authentication credential or credentials to the information contained in the collection of records to determine if the requestor is authorized to sign electronic data using the server;
c. a presentation step of providing to the server an electronic data set for signature;
d. a transaction identifier step of generating at the server a globally unique transaction identifier for the electronic data set that the requester intends to sign, which includes as one input an identifier associated with an identity of the requestor;
e. a signature step whereby the server encrypts, as the signature of a signer, each electronic data set with a unique encryption key generated from a symmetric cipher using the globally unique transaction identifier as character input for a password for generation of the key;
f. a recording step in which the server generates and stores in a data storage medium a record of a signature transaction;
g. a verification step whereby
   i. an inquiring party seeking to validate a signature of electronic data transmits to a server electronic data that is believed to have been previously signed at a server;
   ii. the server that receives the electronic data that is believed to have been previously signed at a server determines if a record or a plurality of records corresponding to the transmitted electronic data exists in the data storage medium of such records;
   iii. the server retrieves a record or plurality of records corresponding to the electronic data which is presented for verification;
   iv. with regard to each such record, the server performs a verification operation which includes a step of reconstructing a symmetric cipher from a record of input for a password of a key that was used to create an encryption key initially, including an identifier of the signer, and applying such symmetric cipher to decrypt the electronic data set;
   v. after decryption, the server reports to an inquiring party,
       1. whether the electronic data submitted for verification remains unmodified since a signature was affixed, and
       2. an identity of a signer of the electronic data.

2. The method of claim 1 wherein the electronic data set which is symmetrically encrypted during signature and decrypted upon verification at a server consists of one of the following:
   a. a message digest of the electronic data;
   b. a crypto-transformation, created using a private key, of the message digest of the electronic data.

3. The method of claim 1 wherein the electronic data submitted for signature consists of one of the following:
   a. form input of a signer;
   b. a combination of form input of a signer and standardized words, clauses, or phrases.

* * * * *